United States Patent [19]
Holmberg et al.

[11] Patent Number: 5,954,559
[45] Date of Patent: Sep. 21, 1999

[54] COLOR FILTER STRUCTURE AND METHOD OF MAKING

[75] Inventors: Scott H. Holmberg, Pleasanton; Shan Zhu, Fremont, both of Calif.

[73] Assignee: Image Quest Technologies, Inc., Fremont, Calif.

[21] Appl. No.: 08/785,140

[22] Filed: Jan. 13, 1997

[51] Int. Cl.[6] .................................................. G02F 1/1335
[52] U.S. Cl. .................................................. 445/24; 430/7
[58] Field of Search .................................. 445/24; 430/7; 349/110

[56] References Cited

U.S. PATENT DOCUMENTS

5,689,318  11/1997  Matsuyama et al. .................. 430/7 X
5,695,690  12/1997  Swirbel et al. ....................... 349/106 X
5,719,074   2/1998  Hawkins et al. ...................... 430/7 X

*Primary Examiner*—Kenneth J. Ramsey
*Attorney, Agent, or Firm*—Townsend and Townsend and Crew LLP

[57] ABSTRACT

An improved planar color filter structure to reduce defects in the display devices incorporating the color filter structures, including active matrix displays. A color filter substrate has a thicker polyamide black matrix formed thereon and a transparent polyamide layer formed over the black matrix. The transparent layer is exposed through the black matrix and developed to remove the unexposed portions over the black matrix. The resulting surface is substantially planar and facilitates the forming of the remaining layers to form a substantially planar color filter structure.

7 Claims, 6 Drawing Sheets

COLOR FILTER STRUCTURE AND METHOD OF MAKING

BACKGROUND OF THE INVENTION

The present invention pertains to an improved color filter structure, method of making the color filter structure and displays incorporating the color filter structure. More particularly, the present invention is directed to a method of making a color filter structure, which substantially planarizes the color filter structure to enhance the performance and to increase the yield of the devices made therefrom.

In recent years there has been growing interest in thin film transistors and devices incorporating such thin film transistors, such as memory arrays, all types of integrated circuits and replacements for mechanical switches and relays. For example, reed relays can fatigue and MOS switches exhibit too much leakage current.

A specific exemplary use of the thin film transistor is in flat panel displays, such as those which employ liquid crystals, field emission, plasma, electrochromic or electroluminescense, as replacements for conventional cathode ray tubes (CRT). The flat panel displays promise lighter weight, less bulk and substantially lower power consumption than CRT's. Also, as consequence of their mode of operation, CRT's nearly always suffer from some distortion. The CRT functions by projecting an electron beam onto a phosphor-coated screen. The beam will cause the spot on which it is focused to glow with an intensity proportional to the intensity of the beam. The display is created by the constantly moving beam causing different spots on the screen to glow with different intensities. Because the electron beam travels a further distance from its stationary source to the edge of the screen that it does to the middle, the beam strikes various points on the screen at different angles with resulting variation in spot size and shape (i.e. distortion).

Flat panel displays are inherently free of such distortion, because each pixel is photolithographically patterned on the substrate as opposed to being defined by where the CRT electron beam strikes the phosphor on the screen. In the manufacture of the flat panel displays the circuit elements are deposited and patterned, generally by photolithography, on a substrate, such as glass. The elements are deposited and etched in stages to build a device having a matrix of perpendicular rows and columns of circuit control lines with a pixel contact and control element between the control line rows and columns. The pixel contact has a medium thereon which is a substance that either glows (emissive) or modulates the transmission of ambient light (nonemissive) when a threshold voltage is applied across the medium control element. The medium can be a liquid crystal, electroluminescent or electrochromic materials such as zinc sulfide, a gas plasma of, for example, neon and argon, a dichroic dye, or such other appropriate material or device as will luminesce or otherwise change optical properties in response to the application of voltage thereto. Light is generated or other optical changes occur in the medium in response to the proper voltage applied thereto. The optically active medium on each contact is generally referred to as a picture element or "pixel".

The circuitry for a flat panel display is generally designed such that data is generally shifted in on all the column lines each to a predetermined voltage. One row is then energized to turn on all the transistors in that row (one row is written at time). That row is then shut off and the data for the next row is shifted into all the column lines and then the second row I energized and written. This process is repeated until all the rows have been addressed. All the rows are generally written in one frame period, typically about 1/60th of a second or about 16.7 ms. Then voltages representing the data are supplied selectively to particular columns to cause selected pixels to light up or change optical properties as the row is written. The pixels can be made to change intensity by applying a large voltage or current or a longer pulse of voltage or current. Utilizing liquid crystal display (LCD's) with twisted nematic active material, the display is substantially transparent when not activated and becomes light absorbing when activated or vice versa depending upon polarizer orientation. Thus, the image is created on the display by sequentially activating the pixels, row by row across the display. The geometric distortion described above with respect to CRT's is not a factor in flat panel displays since each pixel location is photolithographically determined and fixed.

One of the major problems that arises with respect to the prior art method of manufacturing structures for active matrix displays (e.g. those employing thin film transistors at each pixel) is that they generally suffer production yield problems similar to those of integrated circuits. That is, the yields of devices produced are generally not 100% and the yield (percentage of devices with no defects) can be 0% in a worst case. High quality displays will tolerate very few defective transistors or other components. Also, larger size displays are generally more desirable than smaller size displays. Thus, a manufacturer is faced with the dilemma of preferring to manufacture larger size and/or higher resolution displays, but having to discard the entire product if more than a few transistors and hence if more than a few pixels are defective. In other words, the manufacturer suffers a radically increased manufacturing cost per unit resulting from decreasing usable product yield.

One problem encountered with making any type of display occurs when making color displays, which are becoming the standard display type for most, if not all, high quality displays. The color filter structure is formed on the display backplane over the black matrix. If the black matrix is not very thin, then step coverage of the filter medium over the black matrix causes nonuniformity in the surface of the color filter structure. When the backplane is put together against the nonuniform color filter structure substrate, the spaces utilized therebetween can cause defective displays or displays that will fail over time.

SUMMARY OF THE INVENTION

There is provided an improved method of making a color filter structure to reduce defects in the devices incorporating the color filter structure, for example active matrix displays. A color filter substrate has a thicker polyamide black matrix formed thereon and a transparent polyamide layer formed over the black matrix. The transparent layer is exposed through the black matrix and developed to remove the unexposed portions over the black matrix. The resulting surface is substantially planar and facilitates the forming of the remaining layers to form a substantially planar color filter structure.

DESCRIPTION OF THE PREFERRED EMBODIMENTS

Figure 1:
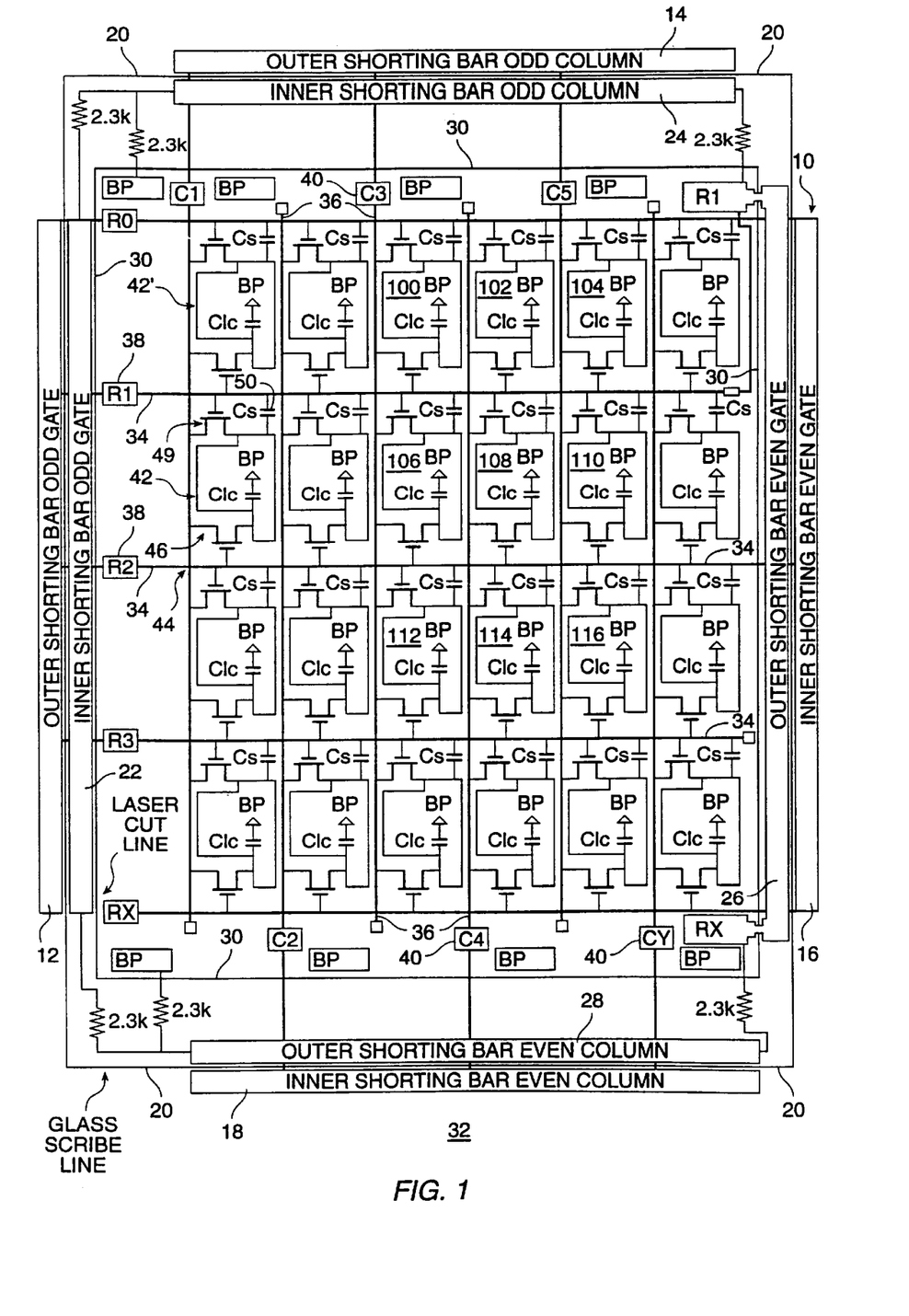
FIG. 1 is a plan view schematic representation of an active matrix display which can incorporate the color filter structure of the present invention.

The color filter structure of the present invention can be utilized in any type of color display, but will be described herein as utilized in active matrix liquid crystal displays (AMLCD's) formed with thin film transistors (TFT's). Referring to FIG. 1, a schematic representation of an AMLCD of a prior invention is disclosed in pending application U.S. Ser. No. 08/497,371, entitled IMPROVED TFT, METHOD OF MAKING AND MATRIX DISPLAYS INCORPORATING THE TFT, filed Jul. 31, 1995 and incorporated herein by reference. The prior TFT is designated generally by the reference numeral 10.

The AMLCD 10 is illustrated including a set of optional outer shorting bars 12, 14, 16 and 18, which are more fully described in copending application Case U.S. Ser. No. 08/497,372, entitled ACTIVE MATRIX ESD PROTECTION AND TESTING SCHEME, also filed Jul. 31, 1995 and also incorporated herein by reference. The outer shorting bars 12, 14, 16 and 18 are removed during processing by breaking them away along a scribe line 20, as more fully described in the incorporated application.

The AMLCD 10 also is illustrated including a set of inner shorter bars 22, 24, 26 and 28. The inner shorting bars 22, 24, 26, and 28 also are utilized during processing, as more fully described in the incorporated application. However, the inner shorting bars 22, 24, 26 and 28 only are electronically disconnected from the AMLCD 10 along a line 30 such as by a laser, but remain a physical part of the AMLCD 10.

The AMLCD 10 is deposited on a substrate 32, commonly formed from a glass panel, which is broken away along the scribe line 20 as above described. The substrate 32 also can be formed from other types of insulating materials, including for non-light transmissive applications a metallic panel with an insulative coating. The AMLCD 10 is formed with a plurality of row lines 34 and a plurality of column lines 36 forming a large matrix, only a small portion of which is illustrated. The row lines 34 include one of a plurality of driver contact pads 38 connected to each line 34 and the column lines 36 also include one of a plurality of driver contact pads 40 connected to each line 36.

The AMLCD 10 includes a plurality of identical pixels formed between the row lines 34 and the column lines 36, therefore only one pixel 42 will be described in detail. At each matrix crossover point 44, where a row line 34 and a column line 36 cross, a TFT 46 is formed to connect both lines to a pixel contact 48. The active liquid crystal medium is formed at least over the contact 48, which medium will change properties in response to the backplane and data voltages applied to the pixel 42. The medium on the pixel 42 will appear generally as a square or dot in the overall matrix of the AMLCD 10. The actual size of the transistor 46 and the contact 48 are not drawn to scale, but are shown schematically for illustration only.

It should be noted that there is no theoretical limit on the number of row lines 34 and column lines 36 that can be employed or on the outside dimension of an AMLCD 10. The processing equipment provides a practical limit on the outside dimension, which limit is continually changing as the equipment is improved.

The problem encountered with manufacturing AMLCD's is that if the AMLCD 10 contains defective TFT's or other circuit elements causing more than a few pixels to be inoperative, the display generally must be discarded. One technique of masking defective pixels 42, is to employ an additional (optional) transistor 49 with the pixel 42 coupling the pixel 42 to an adjacent row R1. Then, when row R1 is written the data is applied not only to the previous pixel 42', but also through the transistor 49 into the pixel 42. When row r. then is written the data for the pixel 42 is written over the data from the previous pixel through the transistor 46. If, however, the transistor 46 is defective, the pixel 42 will not show as inoperative, but instead will retain the data from the previous row R1. This masks the fact that the pixel 42 is not operating correctly.

Figure 4:
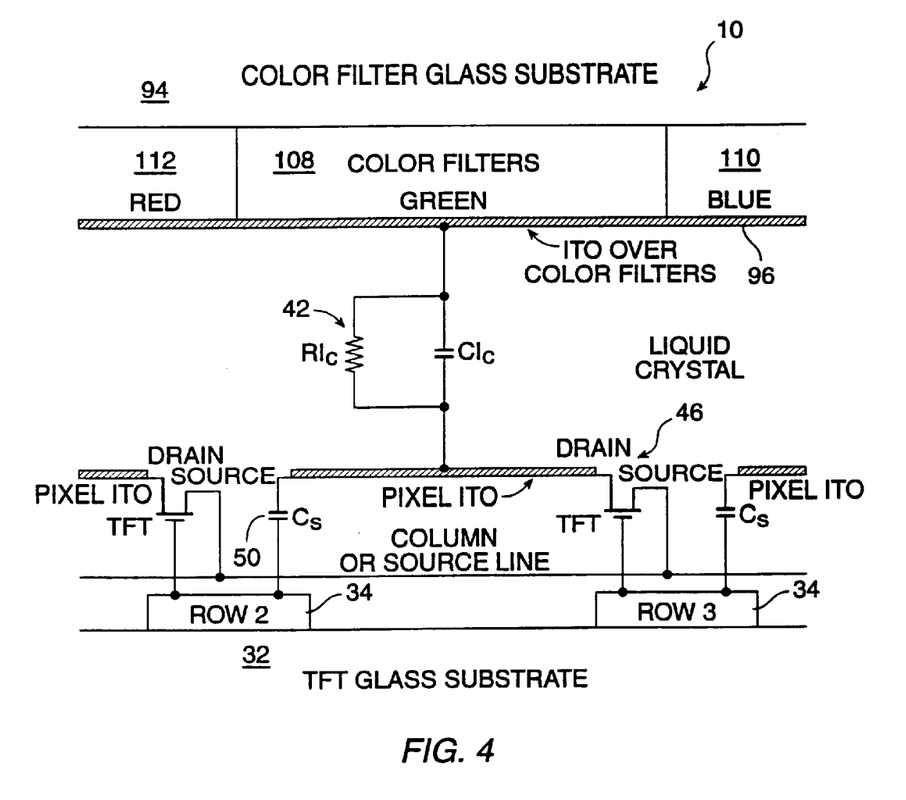
FIG. 4 is a partial diagramatic view of the completed display.

As further described in FIG. 4, the pixel 42 also can include a storage capacitor 50 coupled to the row R1 which maintains and stabilizes the voltage written into the pixel 42 during each frame.

Figure 2:
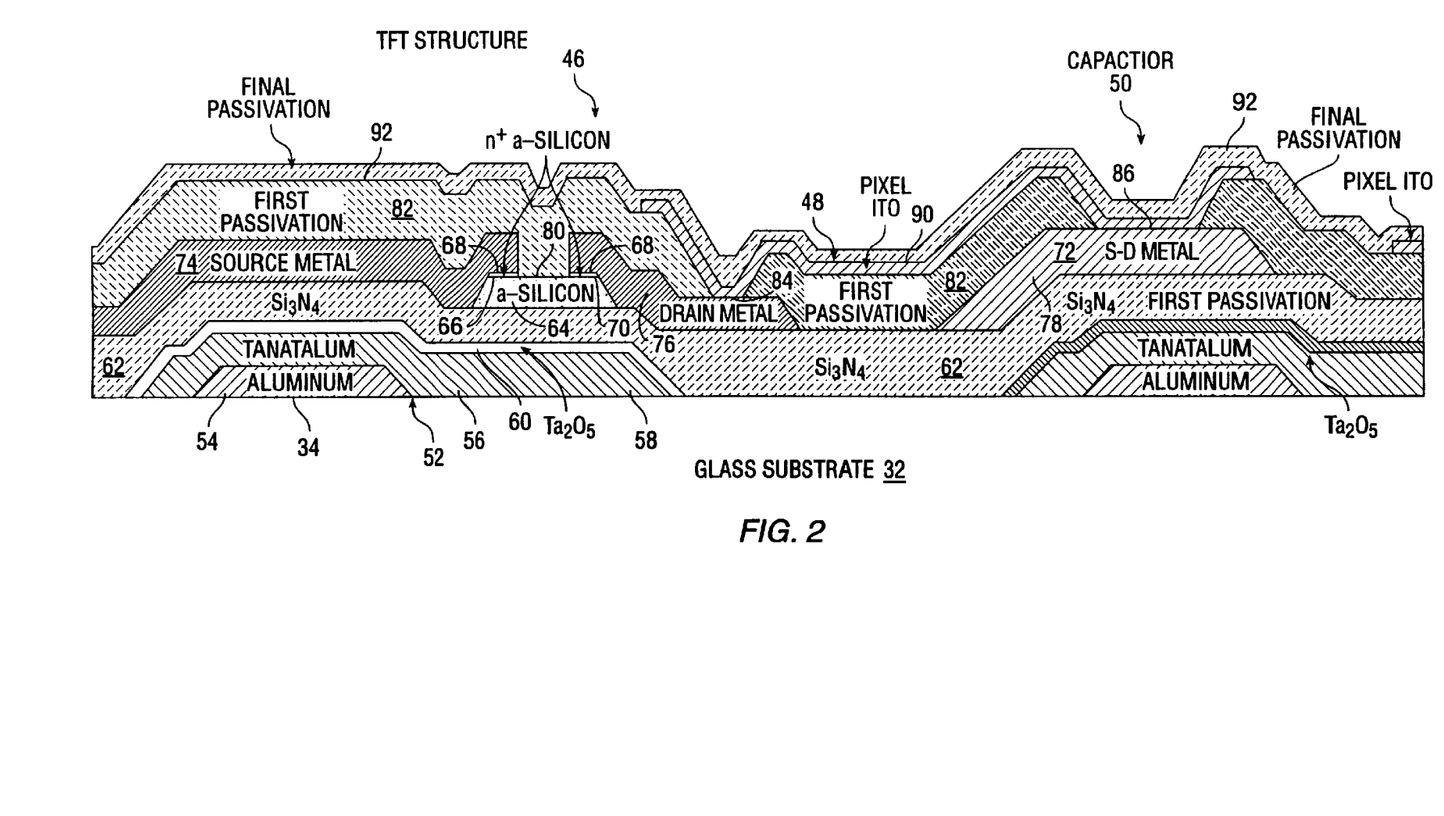
FIG. 2 is a staggered cross-section of one embodiment of a transistor and a storage capacitor of the display of FIG. 1.
Figure 3:
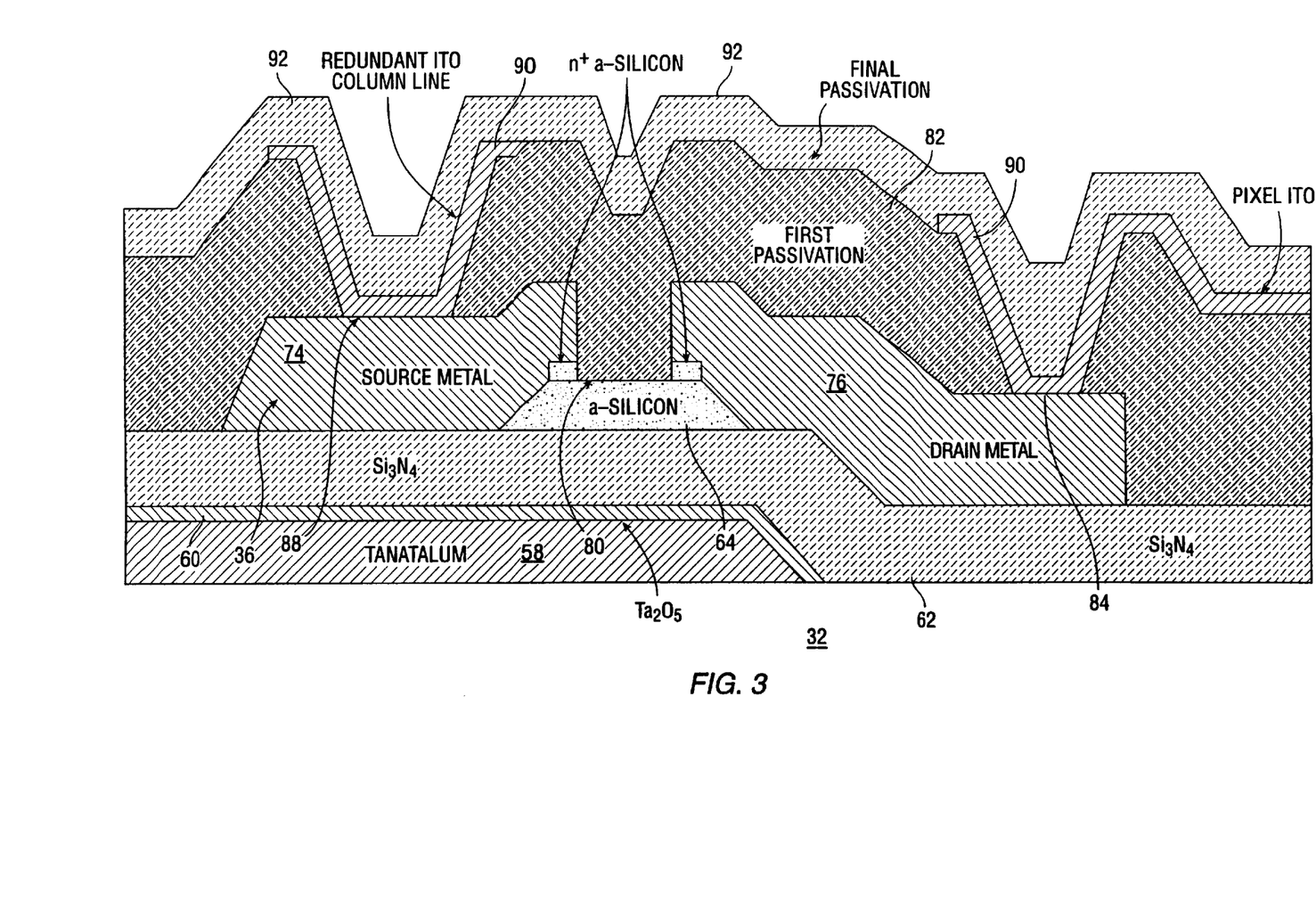
FIG. 3 is a second cross-section of the transistor embodiment of FIG. 2.

The TFT 46 and the AMLCD 10 are formed to enhance the yield of active pixels. The TFT 46 will be described with reference to FIGS. 2 and 3. The TFT 46 is formed with a gate 52 being deposited first as the row line 34. The completed TFT 46 is illustrated in FIGS. 2 and 3, while the various process steps are best illustrated in the incorporated pending application. Although the various layer thicknesses are not critical, preferable thicknesses and materials are described to form a preferred embodiment of the TFT 46 and the AMLCD 10.

The gate 52 preferably is formed of two layers of metal, a first layer of aluminum, preferably an aluminum/copper alloy, is deposited and patterned to form a line element 54. To form a redundant row line 34, a second gate layer of tantalum is deposited over the aluminum element 54 and patterned to form a line element 56 which covers the element 54. The element 56 also has fingers 58 which form the actual gates for the individual TFT's 46. The line element 54 preferably is formed from aluminum or an aluminum alloy. Aluminum is utilized for long lines because of its high conductivity, but is not critical for small displays and can be eliminated from small displays if desired. The aluminum is deposited to about 1200 Angstroms to provide conductivity, but still be thin enough to prevent step coverage problems over the element 54. The tantalum element 56 or other anodic refractory metal preferably is deposited separately for redundancy to about 2000 Angstroms. The fingers 58 which form the gates for the TFT 46 do not require the aluminum layer and typically are formed only of tantalum.

A first gate insulator layer 60 is then formed by anodizing the exposed tantalum element 56, which is hard anodized to form the insulator layer 60 from tantalum oxide, $Ta_2O_2$. A hard anodization can be performed by utilizing a solution of 0.1 to 4.0 percent citric acid in deionized water. A voltage of about sixty (60) volts can be utilized which will form a very precise and uniform oxide layer 60 to about fifteen (15) Angstroms per volt or about a thickness of 900 Angstroms. The pads 38 and 40 can be covered with photoresist to prevent anodization of the pads or can be anodized and then later etched.

Alternatively, the first gate insulator 60 can be formed by a deposited dielectric layer. A second or redundant gate insulator 62 then is deposited, preferably silicon nitride, $Si_3N_4$, to a thickness of about 3000 Angstroms. Two additional layers sequentially are deposited, a layer of amorphous silicon 64 and then a layer of N+ doped amorphous silicon 66. The N+ layer 66 and amorphous silicon layer 64 selectively are etched to leave discrete areas 70 over the gate portions 58 on the nitride layer 62. The amorphous silicon layer 64 is deposited to a thickness of about 1500 Angstroms and the N+ layer 66 is deposited to a thickness of about 300 Angstroms. After patterning the remaining N+ layer forms ohmic contact portions 68. A reanodization can be performed before the next metal layer is deposited to prevent potential shorts, especially at any point that the drain or source metal overlies the gate metal. The reanodization is performed at a voltage at least twice the maximum voltage normally present between the source and gate lines. The reanodization will form a new oxide in the tantalum or underlying aluminum layer to prevent a later deposited metal from shorting to the gate line through a pinhole which exposed the gate metal.

A source-drain (S-D) layer 72 then is deposited, preferably formed from a plurality of metal layers for large displays. For small displays, the layer 72 can be a single metal layer, such as aluminum or molybdenum. A preferable large device multilayer 72 is formed by depositing a first barrier layer of molybdenum to a thickness on the order of 500 Angstroms. A second conductivity enhancing layer of aluminum or aluminum alloy then is deposited to a thickness of about 5000 Angstroms. A third barrier layer of molybdenum or molybdenum alloy then is deposited to a thickness of about 300 Angstroms. Alternatively, only the first two layers are required to be deposited.

The S-D layer 72 then is patterned to form a source portion 74, a drain portion 76 and a top capacitor contact portion 78. A transistor channel region 80 then is formed between the source and drain portions 74 and 76 by removing the N+ doped layer between the contact portions 68; which remain under the S-D metal portions 74 and 76. At this point the transistor 46 is electrically functional.

The storage capacitor 50 also now is electrically functional and is formed by the contact portion 78 and the underlying portions of the nitride layer 62, the oxide layer 60 and the gate 52. Both the transistor 46 and the capacitor 50 can now be electrically tested, as desired.

A first passivation layer 82 then is deposited, preferably formed of $Si_3N_4$ to a thickness of about 7000 Angstroms. This dielectric layer also could be formed from deposited $SiO_2$, spin on glass (SOG) or other organic dielectric materials. The layer 82 is patterned to form a drain contact opening 84 and a capacitor contact opening 86. When a redundant column line is to be formed, vias 88 (FIG. 3) are formed to provide contacts to the underlying column line 36.

A pixel ITO layer 90 then is deposited and patterned to form the drain contact at the opening 84, the capacitor contact at the opening 86, the redundant column line by contacting through the vias 88 (where applicable) and the pixel 48. The pixel 48 is not shown to scale and the section is offset to include both the transistor 46 and the capacitor structure 50, which are staggered from one another. The section does not fully illustrate the electrical separation between the column ITO and the pixel ITO 48 (see FIG. 1). The additional transistor 49 (FIG. 1) is not illustrated, but is formed in the same manner as the transistor structure 46.

The TFT structure is then completed by forming a final passivation layer 92. The passivation layer 92 is formed to a thickness of about 2000–3000 Angstroms in the same manner as the layer 82. The layer 92 could also be formed on the color filter substrate or can be formed on both.

The source line 74 is interdigitated with the drain 76. The drain 76 preferably has at least one finger and the source line 74 preferably includes a pair of fingers. A slot or opening is etched through the source line 74 adjacent the fingers. The interdigitization provides several advantages. First, the channel width can be maximized, while the drain to gate capacitance is minimized. A further advantage is provided, since a short in one of the source fingers can be removed during electronic testing by disconnecting the shorted finger. The short effectively can be removed by cutting through to the slot on both sides of the shorted finger.

Although the drain to gate capacitance is minimized by the described interdigitated embodiment, a higher drive current can be obtained by forming additional fingers, for example, the drain can include a pair of fingers and the source include three mating fingers.

Figure 5:
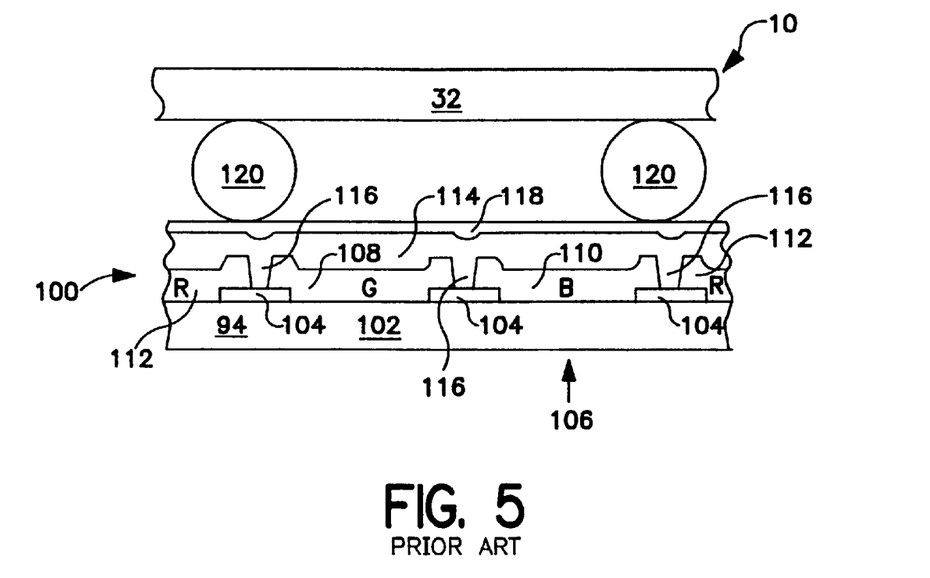
FIGS. 5 & 6 are prior art color filter structure.
Figure 6:
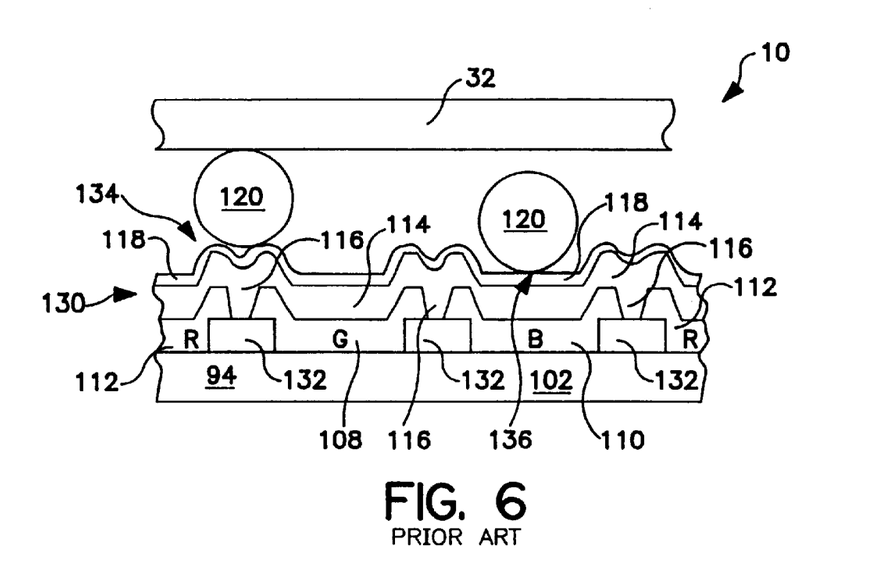

FIG. 4 illustrates a portion of the completed AMLCD 10 and the reason for utilizing the storage capacitor 50. The capacitor 50 stabilizes the voltage across the liquid crystal material at a pixel 42 during the frame period when the pixel row, here row 3, is not addressed. A given pixel row is only addressed one time during a frame period, which frame is generally 1/60th of a second or 16.7 milliseconds. For a 1/480 row AMLCD 10, a given row is only addressed 1/480 of the frame period or about 34.7 microseconds. During the frame time when the pixel row is not addressed the TFT 46 is off. However the pixel voltage should remain constant over the liquid crystal material. The liquid crystal material has a capacitance $C_{LC}$ and a finite resistance $R_{LC}$. The transistor 46 can have leakage between the driver and source and/or through the liquid crystal material resistance $R_{LC}$. To minimize the voltage drop (data decay) across the liquid crystal material the storage capacitor 50 with capacitance $C_S$ is formed in parallel with $C_{LC}$. The pixel 42 driven by the transistor 46 from Row 3 is coupled to the previous Row 2 by the capacitor 50. This assumes that Row 2 is driven just before Row 3. When the transistor 46 for a given row turns on, the transistor 46 charges $C_{LC}$ and $C_S$ since the total capacitance is equal to $C_{LC}+C_S$. The leakage currents of both the transistor 46 an he liquid crystal material are higher (worse) at higher operating temperatures. The liquid crystal material is contained between the TFT substrate 32 and a color filter or monochrome backplane 94. The backplane 94 is separated by spacers from the substrate 32, as illustrated in FIGS. 5 and 6.

As illustrated diagramatically in FIG. 4, the backplane 94 includes the color filter structure and includes an ITO layer 96 over the color filter structure. A prior art color filter structure 100 is illustrated in FIG. 5. The backplane 94 includes a glass substrate 102. A black matrix 104 is formed on the substrate 102. The AMLCD 10 normally is viewed through the glass substrate 102 as indicated by an arrow 106.

One black matrix material utilized is metal, such as chrome. For low end displays, such as laptop AMLCD's, the metal black matrix is satisfactory since it can be deposited and patterned in a thin layer 104 on the order of 800 to 1000 Angstroms. The color filters, a green filter 108, a blue filter 110 and a red filter 112, are formed over the black matrix 104. Since the black matrix 104 is thin, the color filter structure 100 is fairly planar. A passivation layer 114 is formed on top of the color filters 108, 110 and 112. The passivation layer 114 can be spun onto the color filters 108, 110 and 112, which helps even out the steps in the color filters and also helps fill in gaps 116, which are formed between the color filters 108, 110 and 112. The passivation layer 114 is formed from essentially a transparent material which can be spun on, deposited or offset printed in a conventional manner. The passivation layer 114 can be formed from an oxide, a nitride, spun on glass or acrylic, for example.

The passivation layer 114 then has an ITO layer 118 deposited on top of it to a thickness of about 1000 Angstroms. The ITO layer 118 is deposited over the entire AMLCD matrix and then is patterned so the substrate 32 and the backplane 94 can be sealed together with the LCD material (not illustrated) contained between the seal, the substrate 32 and the backplane 94. The substrate 32 and the backplane 94 are separated by a plurality of plastic sphere spacers 120, which are compressed between the substrate 32 and the backplane 94. The spheres 120 can be clear or black coated as desired.

There are a number of problems and potential problems with the color filter structure 100. The metal such as chrome, utilized for the black matrix 104 has a high reflectivity. For a high resolution AMLCD, the reflectivity can only be on the order of one (1) percent or less. Each of the color filters 108, 110 and 112 is separately formed. For example, the G color filter 108 can be formed first. The color filter material, such as dyed polyamide can be spun down, then baked, deposit photoresist, expose and develop or etch the photoresist. After these steps are completed, the G color filter 108 then is formed over one-third of the AMLCD. The B color filter 110 and the R color filter 112 then separately are formed in the same manner as the G color filter 108. If two of the color filters overlap over the black matrix 104, then a high spot is seen which is the sum of the two colors. If an edge of the black matrix 104 is left uncovered, then the display will wash out since the light will not be attenuated by a color filter.

To reduce the reflectivity other black matrix material can be utilized, but the material must be deposited or formed to a much greater thickness as illustrated by another color filter structure 160 in FIG. 6. The black matrix material can be a pigment or dye based polyamide material, such as acrylic. The photopic reflectivity data on several different black matrix materials which can be utilized is illustrated in Table I (taken through the substrate 94, without a polarizer, at a 30 degree incident angle).

TABLE I

| Black acrylic | 0.64% |
|---|---|
| Black metal | 0.81% to 2.0% |
| Conventional black metal | 5.2% |

At first glance, it would appear that a black metal can approach the low reflectivity of an acrylic coating. However, the metal provides a specular reflection. This means that the polarization state does not change. The acrylic material however has a diffuse reflection. This means that the light is de-polarized. With the light de-polarized, there is once again a 50% loss through the front polarizer as the reflected light emerges from the AMLCD. Taking the polarizer loss into account yields the reflectivity data in Table II:

TABLE II

| Black acrylic | 0.32% |
|---|---|
| Black metal | 0.81% to 2.0% |
| Conventional black metal | 5.2% |

The black acrylic black matrix material is very expensive, on the order of greater than $1500 per gallon. If this material is spun onto the substrate 102 about ninety (90) percent is wasted. Therefore, it is preferable to offset print the black acrylic black matrix material onto the substrate 102, which eliminates virtually all of the wasted material. The advantage of the metal black matrix is that it is very thin. The disadvantage is the high reflectivity and it must be sputtered or evaporated onto the substrate 102 and then photolithographically processed.

The black acrylic black matrix material is deposited, but since it has a much smaller absorption constant it must be deposited in a much thicker layer on the order of 1.2 microns. The black acrylic is exposed and developed off to form a black matrix 132. The black matrix 132 then is baked so it is not developed off with the color filter layers. The G, B and R color filters 108, 110 and 112 then are separately formed in a like manner to form the color filter structure 130.

Since the black matrix 132 is much thicker, the resulting color filters 108, 110 and 112 are much more uneven because of the step coverage caused by the thick black matrix 132. The passivation layer 114 and the ITO layer 118 again are formed. Ideally, as before described, the color filters 108, 110 and 112 as well as the layers 114 and 118 are smooth and substantially planar. However, with the increased thickness of the black matrix 132, this clearly is not the result.

When the substrate 32 now is applied and sealed to the substrate 102, the spacer spheres 120 are not uniformly spaced. As illustrated, the sphere 120 on the left in FIG. 6 is on a peak or high spot 134 while the sphere 120 on the right is in a valley or low spot 136. This causes a number of problems, since the spheres 120 on the high spots 134 are squashed more than the spheres 120 in the low spots 136. In fact, the spheres 120 in the low spots 136 may not be squashed or fixed at all and can move both vertically and laterally which can cause degradation and failure of the AMLCD's 10.

The black matrix 104, 132 can be on the order of twenty-five (25) percent of the matrix area on the low side and as much as about fifty (50) percent of the matrix area on the high side. It therefore would be desirable to planarize the color filter structure to avoid the problems potentially caused by the uneven nonuniform layers.

Figure 7A:
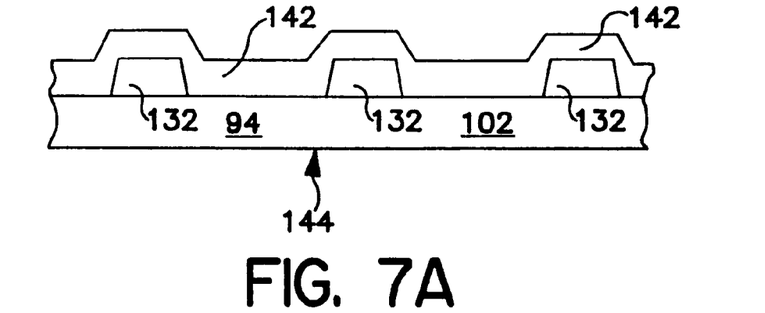
FIGS. 7A, 7B & 7C illustrate an embodiment of the planar color filter structure of the present invention.

Referring now to FIG. 7A, a color filter structure embodiment 140 of the present invention is illustrated. The acrylic black matrix 132 again is formed, again to a thickness on the order of 1.2 microns. However, the next layer formed is a clear polyamide material layer 142 of the same or similar type as the black matrix 132 material and the color filter material. The layer 142 is exposed, not from the top as is conventional, but through the substrate 102 as indicated by an arrow 144. By exposing the layer 142 through the substrate 102, the black matrix 132 acts as a self aligning mask.

Figure 7B:
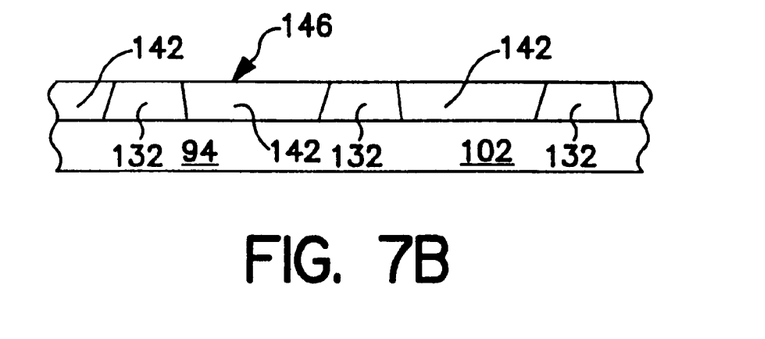

The unexposed portion of the layer 142 overlying each portion of the black matrix 132, then will be developed off as illustrated in FIG. 7B.

Figure 7C:
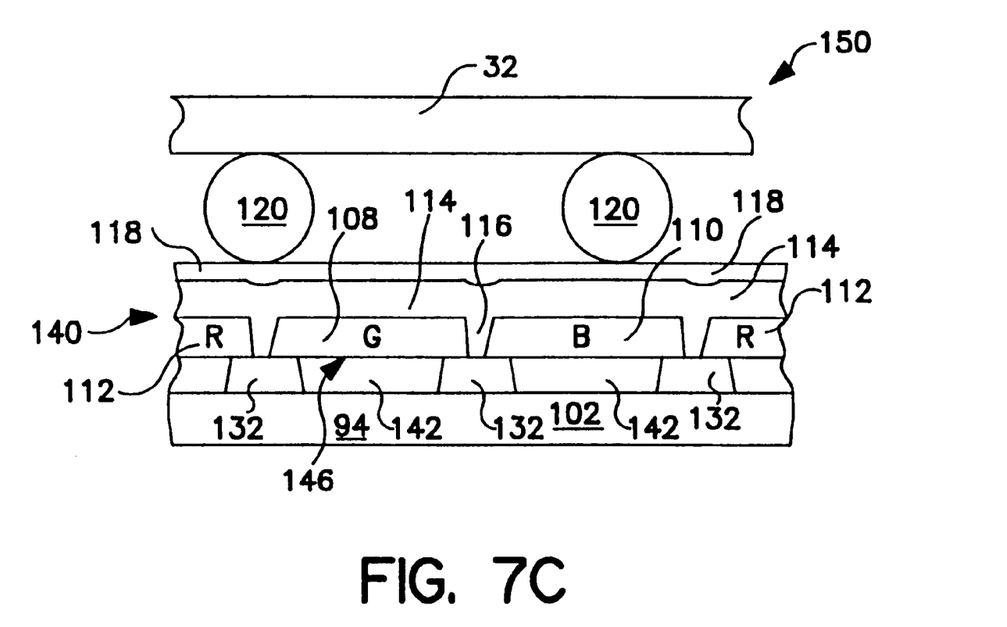

The resulting clear layer 142 is illustrated in FIG. 7B. The layer 142 essentially planarizes the black matrix 132 forming a planar surface 146. This allows the color filters 108, 110 and 112 and the layers 114 and 118 then to be applied as an essentially planar surface layer onto the planar surface 146 now formed by the black matrix 132 and the clear layer 142, as illustrated in FIG. 7C. The layer 142 preferably is selected to be of a thickness about the same as or slightly greater than the thickness of the black matrix 132. The spacer spheres 120 then are compressed substantially equally to form a completed AMLCD 150. The color filter structure 140 of the present invention can of course be utilized in any type of color matrix and is not restricted to the AMLCD 150 described herein for illustration purposes.

Many modifications and variations of the present invention are possible in light of the above teachings. It is therefore to be understood that within the scope of the appended claims, the invention may be practiced otherwise than as specifically described.

What is claimed is:

1. A method of manufacturing a color filter structure, wherein the improvement comprises the steps of:

forming a thick polyamide black matrix on a first substantially transparent substrate, forming a substantially transparent polyamide layer over said black matrix to a thickness substantially equal to the thickness of said black matrix, exposing said transparent layer through said substrate and developing said transparent layer to remove the layer portions over the black matrix forming a substantially planar surface.

2. The method as defined in claim 1 including forming a set of color filters over said planar surface.

3. The method as defined in claim 2 including forming a passivation layer over said color filters.

4. The method as defined in claim 3 including forming an ITO layer over said passivation layer.

5. The method as defined in claim 4 including forming a display device by adding spherical spacers onto said ITO layer and adding a liquid crystal material between said ITO layer and a second substrate.

6. The method as defined in claim 5 including forming an active matrix liquid crystal display device.

7. The method as defined in claim 1 including forming said transparent layer to a thickness slightly greater than the thickness of said black matrix.

* * * * *